(12) United States Patent
Gonda et al.

(10) Patent No.: US 12,002,978 B2
(45) Date of Patent: Jun. 4, 2024

(54) ALKALINE SECONDARY BATTERY AND ALKALINE SECONDARY BATTERY MODULE

(71) Applicant: NGK INSULATORS, LTD., Nagoya (JP)

(72) Inventors: Yuichi Gonda, Nagoya (JP); Keiichi Mori, Ichinomiya (JP); Genta Terazawa, Ichinomiya (JP)

(73) Assignee: NGK INSULATORS, LTD., Nagoya (JP)

( * ) Notice: Subject to any disclaimer, the term of this patent is extended or adjusted under 35 U.S.C. 154(b) by 238 days.

(21) Appl. No.: 17/646,171

(22) Filed: Dec. 28, 2021

(65) Prior Publication Data

US 2022/0123402 A1 Apr. 21, 2022

Related U.S. Application Data

(63) Continuation of application No. PCT/JP2020/026604, filed on Jul. 7, 2020.

(30) Foreign Application Priority Data

Aug. 6, 2019 (JP) .................................. 2019-144597

(51) Int. Cl.
*H01M 10/00* (2006.01)
*H01M 4/42* (2006.01)
(Continued)

(52) U.S. Cl.
CPC ........... *H01M 50/204* (2021.01); *H01M 4/42* (2013.01); *H01M 10/30* (2013.01);
(Continued)

(58) Field of Classification Search
CPC ...... H01M 50/204; H01M 4/42; H01M 10/30; H01M 10/658; H01M 50/227;
(Continued)

(56) References Cited

U.S. PATENT DOCUMENTS 9,293,791 B2   3/2016   Yamada et al.
10,290,847 B2  5/2019   Kitoh et al.
(Continued)

FOREIGN PATENT DOCUMENTS

DE   102013221760 A1 *  5/2015  .......... H01M 2/1223
JP      H10144277 A  *  5/1998  ........ H01M 50/3425
(Continued)

OTHER PUBLICATIONS

Machine translation of WO-2010040520-A2. Obtained from PE2E. (Year: 2010).*

(Continued)

*Primary Examiner* — Nicholas P D'Aniello
(74) *Attorney, Agent, or Firm* — BURR PATENT LAW, PLLC

(57) ABSTRACT

Provided is an alkaline secondary battery including: a stacked-cell battery in which multiple single cell elements having a configuration of an alkaline secondary battery are stacked; and a box-shaped case made of resin in which the stacked-cell battery is housed vertically. The box-shaped case has a bottom, a pair of long-side walls parallel to the stacked-cell battery, a pair of short-side walls perpendicular to the stacked-cell battery, and a lid part. The lid part has a vulnerable portion having a smaller thickness than other portions of the lid part, the thickness of the vulnerable portion is 0.1 to 1.0 mm, and a proportion of an area of the vulnerable portion with respect to a total area of the lid part in a plan view is 10 to 40%.

15 Claims, 10 Drawing Sheets

(51) Int. Cl.
| | | |
|---|---|---|
| *H01M 10/30* | (2006.01) | |
| *H01M 10/658* | (2014.01) | |
| *H01M 50/204* | (2021.01) | |
| *H01M 50/227* | (2021.01) | |
| *H01M 50/271* | (2021.01) | |
| *H01M 50/317* | (2021.01) | |
| *H01M 50/342* | (2021.01) | |
| *H01M 50/434* | (2021.01) | |
| *H01M 50/449* | (2021.01) | |

(52) U.S. Cl.
CPC ....... *H01M 10/658* (2015.04); *H01M 50/227* (2021.01); *H01M 50/271* (2021.01); *H01M 50/317* (2021.01); *H01M 50/3425* (2021.01); *H01M 50/434* (2021.01); *H01M 50/449* (2021.01)

(58) Field of Classification Search
CPC ............. H01M 50/271; H01M 50/317; H01M 50/3425; H01M 50/434; H01M 50/449; H01M 4/38; H01M 4/481; H01M 50/209; H01M 50/244; H01M 50/383; H01M 50/55; H01M 50/15; H01M 50/289; H01M 50/298; H01M 50/342; Y02E 60/10; Y02P 70/50
See application file for complete search history.

(56) References Cited

U.S. PATENT DOCUMENTS

| | | |
|---|---|---|
| 10,686,177 B2 | 6/2020 | Gonda et al. |
| 2012/0100421 A1 | 4/2012 | Oda et al. |
| 2017/0214019 A1 | 7/2017 | Yokoyama et al. |
| 2019/0267597 A1 | 8/2019 | Gonda et al. |
| 2020/0006729 A1 | 1/2020 | Hayakawa |
| 2022/0102792 A1* | 3/2022 | Yoo ..................... H01M 50/251 |

FOREIGN PATENT DOCUMENTS

| | | | | |
|---|---|---|---|---|
| JP | 2004-152697 A | 5/2004 | | |
| WO | WO-2010040520 A2 * | 4/2010 | .......... | H01M 2/0242 |
| WO | 2011/048782 A1 | 4/2011 | | |
| WO | 2013/118561 A1 | 8/2013 | | |
| WO | WO-2014040791 A1 * | 3/2014 | ........ | H01M 10/0431 |
| WO | 2016/067884 A1 | 5/2016 | | |
| WO | 2016/076047 A1 | 5/2016 | | |
| WO | 2017/086278 A1 | 5/2017 | | |
| WO | 2018/105178 A1 | 6/2018 | | |
| WO | 2018/173110 A1 | 9/2018 | | |
| WO | 2019/069760 A1 | 4/2019 | | |
| WO | 2019/069762 A1 | 4/2019 | | |

OTHER PUBLICATIONS

Machine translation of DE-102013221760-A1, obtained from PE2E. (Year: 2015).*
Machine translation of WO-2014040791-A1, obtained from PE2E. (Year: 2014).*
Machine translation of JP-H10144277-A, obtained from PE2E. (Year: 1998).*
Japanese Office Action (Application No. 2021-537632) dated Oct. 6, 2022 (with English translation).
Chinese Office Action (Application No. 202080047995.0) dated Apr. 26, 2023 (10 pages).
International Search Report and Written Opinion (Application No. PCT/JP2020/026604) dated Sep. 29, 2020 (with English translation).

* cited by examiner

ALKALINE SECONDARY BATTERY AND ALKALINE SECONDARY BATTERY MODULE

CROSS-REFERENCE TO RELATED APPLICATIONS

This application is a continuation application of PCT/JP2020/026604 filed Jul. 7, 2020, which claims priority to Japanese Patent Application No. 2019-144597 filed Aug. 6, 2019, the entire contents all of which are incorporated herein by reference.

BACKGROUND OF THE INVENTION

1. Field of the Invention

The present invention relates to an alkaline secondary battery and an alkaline secondary battery module.

2. Description of the Related Art

In order to obtain high voltage and high current, stacked-cell batteries, which are made by combining multiple single cells, have been widely adopted. In a stacked-cell battery, a stack of multiple single cells connected in series or parallel is housed in one battery container. For example, Patent Literature 1 (WO2017/086278) discloses a zinc secondary battery in which multiple electrode cartridges including electrodes and separators (especially LDH separators described below) are housed in a sealed container.

In addition, in order to further increase capacity and output, it is also common to make a battery module with an array of multiple battery units that contain stacked-cell batteries. For example, Patent Literature 2 (WO2018/173110) discloses a battery module in which multiple rectangular cuboid-like battery units are housed in a frame structure, and mentions that it is preferable that the single cells of the multiple alkaline secondary batteries (e.g., nickel-zinc secondary batteries and zinc-air secondary batteries) be housed in the battery units, in the form of an assembled battery or a battery module.

Incidentally, it is known that in zinc secondary batteries such as nickel-zinc secondary batteries and zinc-air secondary batteries, metallic zinc precipitates from the negative electrode in the form of dendrite during charging, penetrates the air gap in the separator such as a non-woven fabric, and reaches the positive electrode, resulting in a short circuit. Such short circuits caused by zinc dendrites shorten the repetitive charge-discharge life. To address this problem, batteries including layered double hydroxide (LDH) separators that selectively allow hydroxide ions to permeate while preventing penetration of zinc dendrites have been proposed. For example, Patent Literature 3 (WO2013/118561) discloses the use of an LDH separator between the positive and negative electrodes in a nickel-zinc secondary battery. Patent Literature 4 (WO2016/076047) discloses a separator structure with an LDH separator fitted or bonded to a resin outer frame, and discloses that the LDH separator has such a high densification that it is gas impermeable and/or water impermeable. This literature also discloses that the LDH separator can be combined with a porous substrate. Patent Literature 5 (WO2016/067884) discloses various methods for obtaining a composite material (LDH separator) by forming an LDH dense film on the surface of a porous substrate. This method includes the step of uniformly attaching a starting material that can provide a starting point for LDH crystal growth to the porous substrate and hydrothermally treating the porous substrate in an aqueous solution of a raw material to form an LDH dense film on the surface of the porous substrate. Patent Literature 6 (WO2019/069762) discloses a method for efficiently manufacturing a negative electrode structure suitable for zinc secondary batteries (especially stacked-cell batteries thereof) that can prevent zinc dendrite extension by covering or wrapping the entire negative electrode active material layer with a liquid retention member and LDH separator.

CITATION LIST

Patent Literature

Patent Literature 1: WO2017/086278
Patent Literature 2: WO2018/173110
Patent Literature 3: WO2013/118561
Patent Literature 4: WO2016/076047
Patent Literature 5: WO2016/067884
Patent Literature 6: WO2019/069762

SUMMARY OF THE INVENTION

Alkaline secondary batteries, such as nickel-zinc batteries, which use aqueous electrolytes such as potassium hydroxide solution, are much safer than secondary batteries that use non-aqueous electrolytes containing flammable organic solvents. However, in order to further improve the safety of alkaline secondary batteries, it is desirable to assume the risk of the worst possible abnormal situation and take all possible measures against it. The worst abnormal situation that can be assumed is when hydrogen is generated by decomposition of the aqueous electrolyte and ignites due to a short circuit or the like, causing hydrogen combustion.

The inventors have recently found that the damage caused by a sudden increase in the internal pressure of the battery due to hydrogen combustion or other causes can be minimized, that is, safety can be improved, by providing a vulnerable portion whose thickness is smaller than those of the other parts to the lid part of a resin box-shaped case in which an alkaline secondary battery is housed, and by making the proportion of the area of the vulnerable portion with respect to the entire lid part within a predetermined range.

Therefore, an object of the present invention is to provide a stacked-cell alkaline secondary battery capable of minimizing damage caused by a sudden increase in the internal pressure of the battery due to hydrogen combustion, or other causes. Another object of the present invention is to provide an alkaline secondary battery module that houses a plurality of such alkaline secondary batteries.

According to an aspect of the present invention, there is provided an alkaline secondary battery comprising:
- a stacked-cell battery in which multiple single cell elements having a configuration of an alkaline secondary battery are stacked; and
- a box-shaped case made of resin in which the stacked-cell battery is housed vertically, wherein
- the box-shaped case has a bottom, a pair of long-side walls parallel to the stacked-cell battery, a pair of short-side walls perpendicular to the stacked-cell battery, and a lid part, and
- the lid part has a vulnerable portion having a smaller thickness than another portion of the lid part, the thickness of the vulnerable portion is 0.1 to 1.0 mm, and a proportion of an area of the vulnerable portion with respect to a total area of the lid part in a plan view is 10 to 40%.

According to another aspect of the present invention, there is provided an alkaline secondary battery module comprising:
- a module case that is a metal lidded container; and
- a plurality of the alkaline secondary batteries, being housed in the module case, and being arranged so that the long-side walls face each other.

DETAILED DESCRIPTION OF THE INVENTION

Alkaline Secondary Battery

Figure 1:
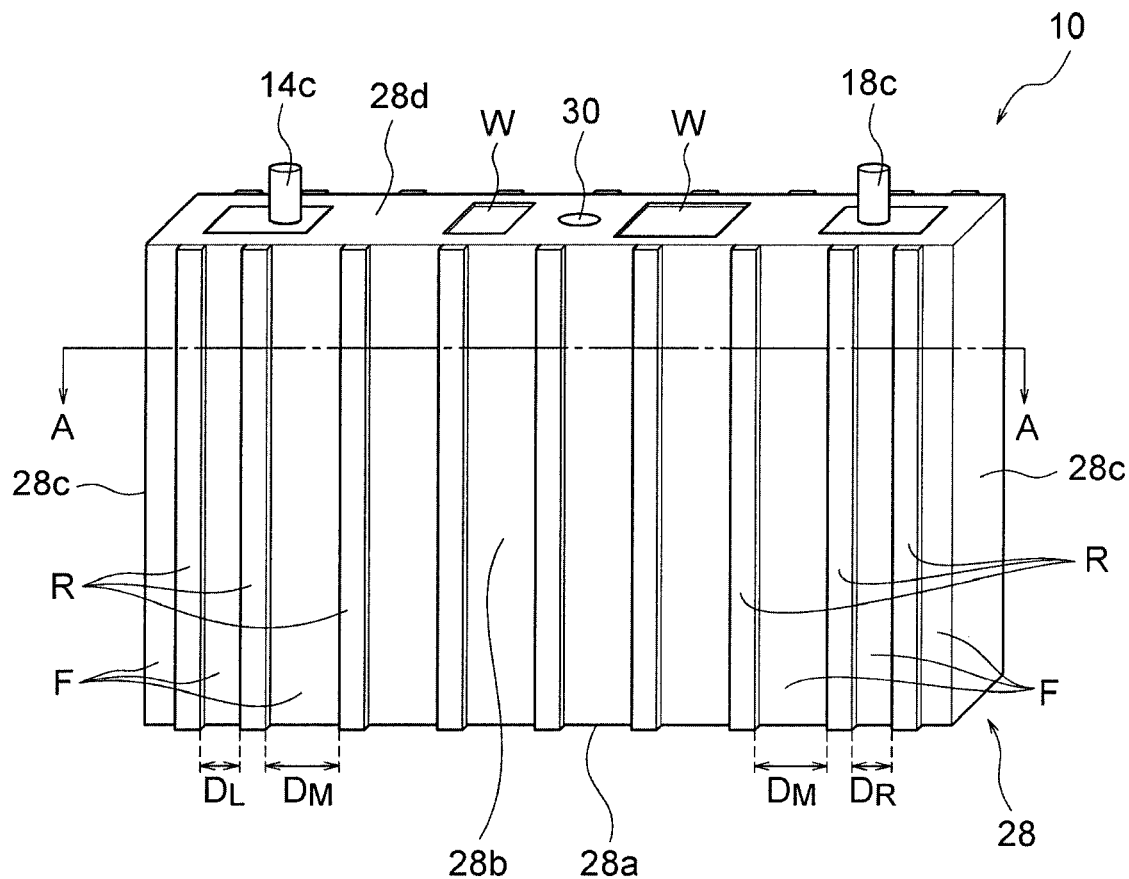
FIG. 1 is a perspective view of an example of an alkaline secondary battery of the present invention.
Figure 2:
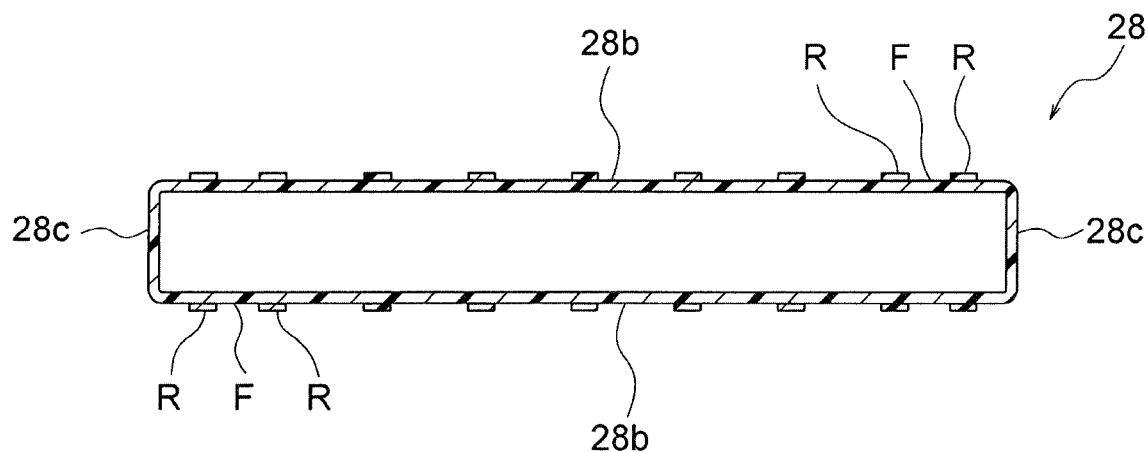
FIG. 2 is a cross-sectional view along line A-A of the box-shaped cases of the alkaline secondary battery shown in FIG. 1.
Figure 3:
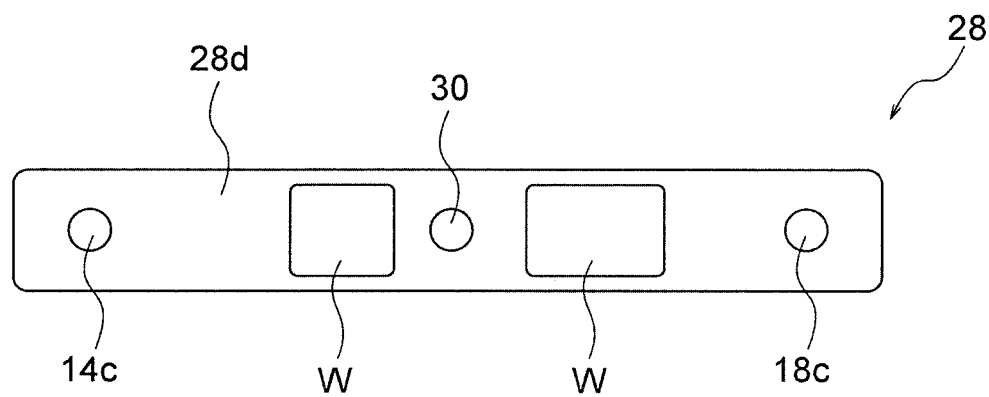
FIG. 3 is a top view of the lid part of the box-shaped case of the alkaline secondary battery shown in FIG. 1.
Figure 4:
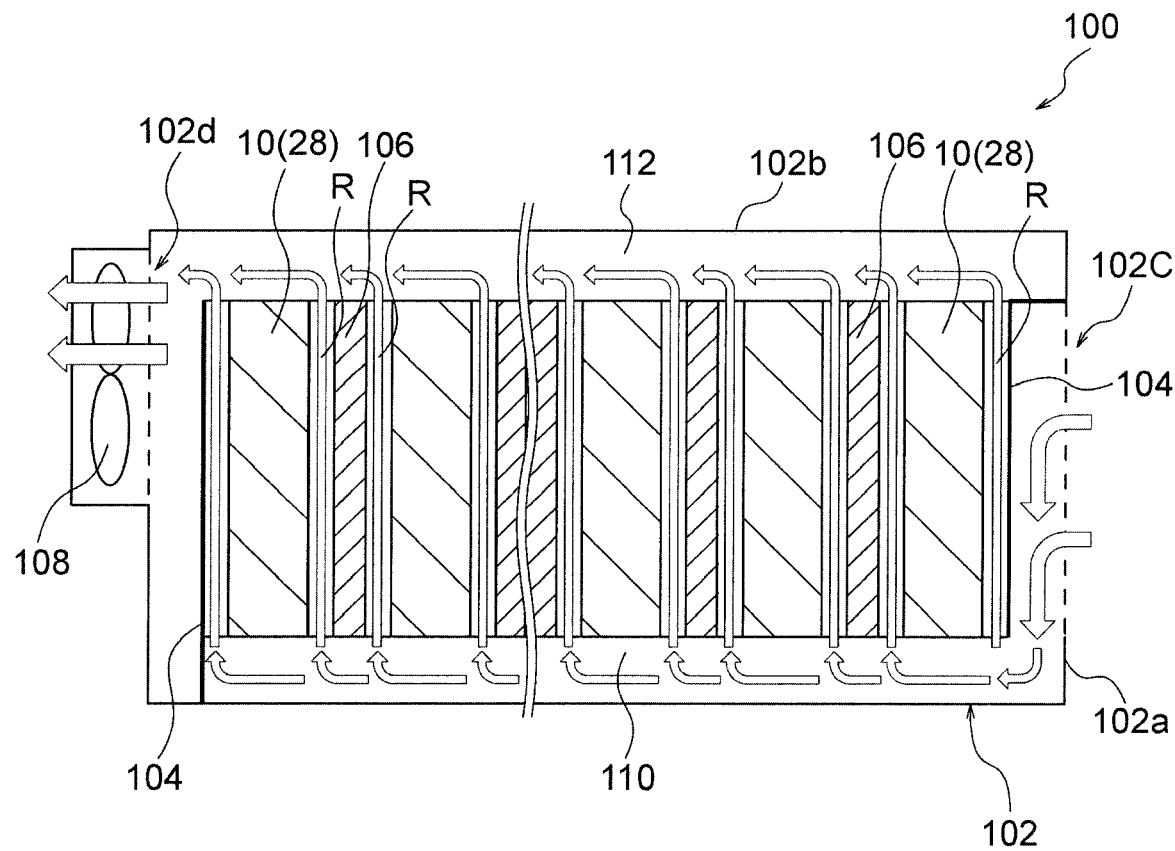
FIG. 4 is a schematic cross-sectional view showing an alkaline secondary battery module of the present invention.
Figure 5:
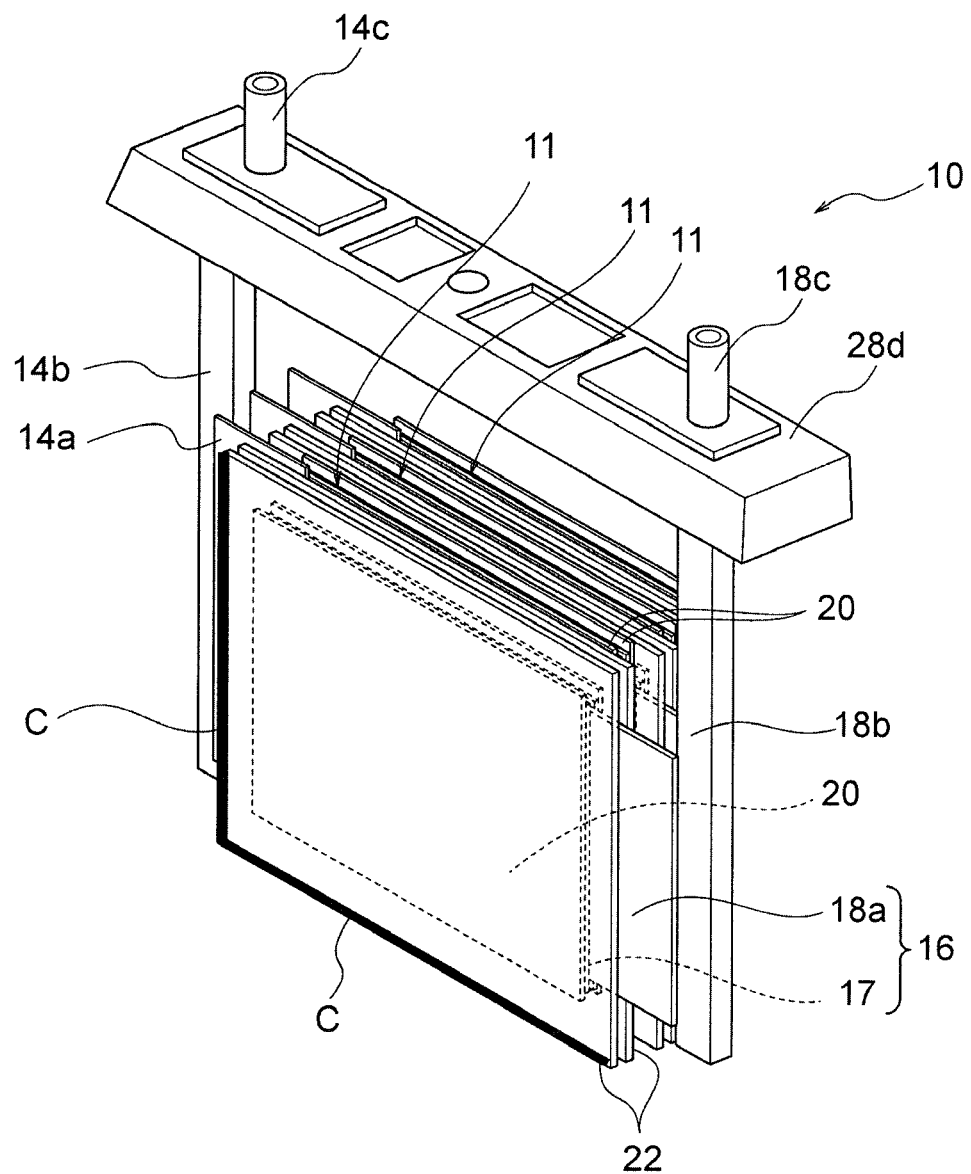
FIG. 5 is a perspective view showing an example internal structure of the alkaline secondary battery shown in FIG. 1.
Figure 6:
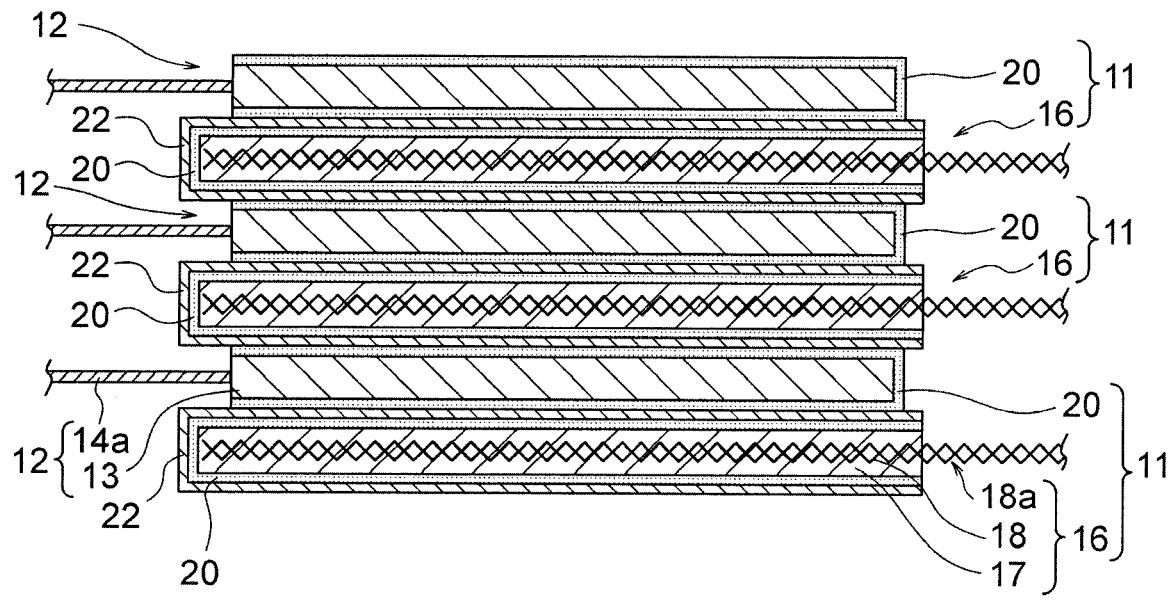
FIG. 6 is a schematic cross-sectional view conceptually showing the layer structure of the alkaline secondary battery shown in FIG. 5.

FIG. 1 shows an example of an alkaline secondary battery of the present invention. The alkaline secondary battery 10 shown in FIG. 1 includes a stacked-cell battery and a box-shaped case 28 in which the stacked-cell battery is housed in a vertical orientation. The box-shaped case 28 is made of resin. As shown in FIGS. 5 and 6, the stacked-cell battery consists of a stack of multiple single cell elements 11 having the configuration of an alkaline secondary battery, and is advantageous in that it can provide high voltage and high current. As shown in FIGS. 1 to 3, the box-shaped case 28 has a bottom 28a, a pair of long-side walls 28b parallel to the stacked-cell battery, a pair of short-side walls 28c perpendicular to the stacked-cell battery, and a lid part 28d. The lid part 28d has a vulnerable portion W that has a smaller thickness than the other portions of the lid part 28d. The thickness of the vulnerable portion W is 0.1 to 1.0 mm, and the proportion of the area of the vulnerable portion W with respect to the area of the entire lid part 28d in the plan view is 10 to 40%. In this way, providing the lid part 28d of the resin box-shaped case 28 in which the alkaline secondary battery 10 is housed, with a vulnerable portion W that has a smaller thickness than the other portions and making the proportion of the area of the vulnerable portion W with respect to the entire lid part 28d within a predetermined range minimizes damage caused by a sudden increase in the internal pressure of the battery due to hydrogen combustion or other causes. In other words, when the internal pressure of the battery suddenly rises due to hydrogen combustion or other causes, the vulnerable portion W is preferentially and locally destroyed before the entire box-shaped case 28 is destroyed, thus avoiding the overall destruction of the box-shaped case 28 and thus improving safety. In addition, since the vulnerable portion W is provided in the lid part 28d, in the case of housing in the module case 102 as shown in FIG. 4, if the top lid 102b of the module case 102 is preferentially designed to be pressure-resistant and heat-resistant and fixed to the container body 102a, even in the event of rupture of the vulnerable portion W due to hydrogen combustion in the nickel-zinc secondary battery 10, various troubles (such as a sudden increase in internal pressure, scattering of fragments, leakage of electrolyte, fire, and abnormal heat generation) associated with the rupture can all be stopped within the module case 102 (especially in the top lid 102b), thereby sufficiently securing safety outside the module case 102.

As shown in FIGS. 1 to 3, the box-shaped case 28 has a bottom 28a, a pair of long-side walls 28b parallel to the stacked-cell battery, a pair of short-side walls 28c perpendicular to the stacked-cell battery, and a lid part 28d. Preferably, the alkaline secondary battery 10 further includes a positive electrode terminal 14c and a negative electrode terminal 18c, and the positive electrode terminal 14c and the negative electrode terminal 18c extend from the lid part 28d. A stacked-cell battery, which is not shown in FIGS. 1 to 3, is a stack of multiple single cell elements 11, i.e., an assembly of multiple single cell elements 11 as shown in FIGS. 5 and 6. The typical basic shape of the box-shaped case 28 is a rectangular parallelepiped, but not necessarily a perfect rectangular parallelepiped, and can be partially curved or partially uneven as long as the overall general shape is a box shape.

The box-shaped case 28 is preferably made of resin. The resin for the box-shaped case 28 is preferably a resin having resistance to alkali metal hydroxides such as potassium hydroxide, more preferably polyolefin resin, ABS resin, or modified polyphenylene ether, even more preferably ABS resin or modified polyphenylene ether.

As shown in FIG. 1, the lid part 28d has a vulnerable portion W that has a smaller thickness than the other portion of the lid part. In this case, the vulnerable portion W is preferably provided between the positive electrode terminal 14c and the negative electrode terminal 18c. The thickness of the vulnerable portion W is 0.1 to 1.0 mm, preferably 0.2 to 0.9 mm, more preferably 0.3 to 0.8 mm. The thickness of the portion of the lid part 28d other than the vulnerable portion W is preferably 1.0 to 3.0 mm, more preferably 1.5 to 2.5 mm, even more preferably 1.7 to 2.3 mm. The thickness of the vulnerable portion W is preferably 0.1 to 0.6 times, more preferably 0.1 to 0.4 times, even more preferably 0.2 to 0.3 times the thickness of the portion of the lid part 28d other than the vulnerable portion W. The thickness of the portion of the box-shaped case 28 other than the lid part 28d is preferably 1.0 to 4.5 mm, more preferably 1.5 to 3.5 mm, even more preferably 2.0 to 2.5 mm.

With the vulnerable portion W, when the internal pressure is excessively increased by the gas generated in the battery during abnormal operations such as over-charge, over-discharge, and short circuits (in the worst case scenario, when hydrogen combustion occurs), the vulnerable portion W is selectively destroyed by the internal pressure to prevent or minimize electrolyte leakage, and the reinforcing part of the module case 102 can be limited within the portion of the top lid 102b near the vulnerable portion W (which fact removes the need for reinforcing the entire module case 102). Another advantage of having the vulnerable portion W on the lid part 28d is more stable opening pressure (smaller opening pressure variations) than having the vulnerable portion W in the long-side wall 28b. In other words, if the vulnerable portion W is provided in the long-side wall 28b, in the completed battery module 100, the long-side wall 28b including the vulnerable portion W receives pressure and is subjected to extra stress which is not the internal pressure of the battery, which interferes with opening pressure stability. In contrast, in the lid part 28d, no force other than the internal pressure of the battery is applied even if the battery module 100 is completed, so that the opening pressure of the vulnerable portion W can be stabilized.

The percentage of the plan view area of the vulnerable portion W to the plan view area of the entire lid part 28d is 10 to 40%, preferably 15 to 30%, more preferably 20 to 25%. The "plan view area of the entire lid part 28d" refers to the entire area enclosed by the outer edge of the lid part 28d when viewed from above, and includes not only the main part of the lid part 28d (including the vulnerable portion W) but also the area occupied by the accessories attached to the lid part 28d, such as the positive electrode terminal 14c, the negative electrode terminal 18c, and the pressure release valve 30. The number of vulnerable portions W is not limited and may be one, but may be two or more as shown in FIG. 1, in which case it is preferable to have two or more vulnerable portions W separated from each other. In this way, the pressure release valve 30 can be placed between the vulnerable portions W (for example, in the center of the lid part 28d).

The vulnerable portion W preferably has a notch-shaped incompletely welded portion (i.e., a notch-shaped portion formed as a result of the welding of the resin members). This can significantly improve the performance of the vulnerable portion W in triggering the breakdown of the vulnerable portion W during a sudden increase in the internal pressure of the battery due to hydrogen combustion, or other causes. Typically, it is preferred that the vulnerable portion W have a portion where at least two resin members are welded together, and a notch-shaped incompletely welded portion exist around this welded portion. In other words, the vulnerable portion W may be formed by welding at least two resin members, and at that time, preferably, part of a notch-shaped incompletely welded portion is left intentionally. The notch-shaped incompletely welded portion preferably lie at least in the direction perpendicular to the thickness of the lid part 28d (i.e., in the direction of the plate surface), but may lie in any other direction.

Figure 13A:
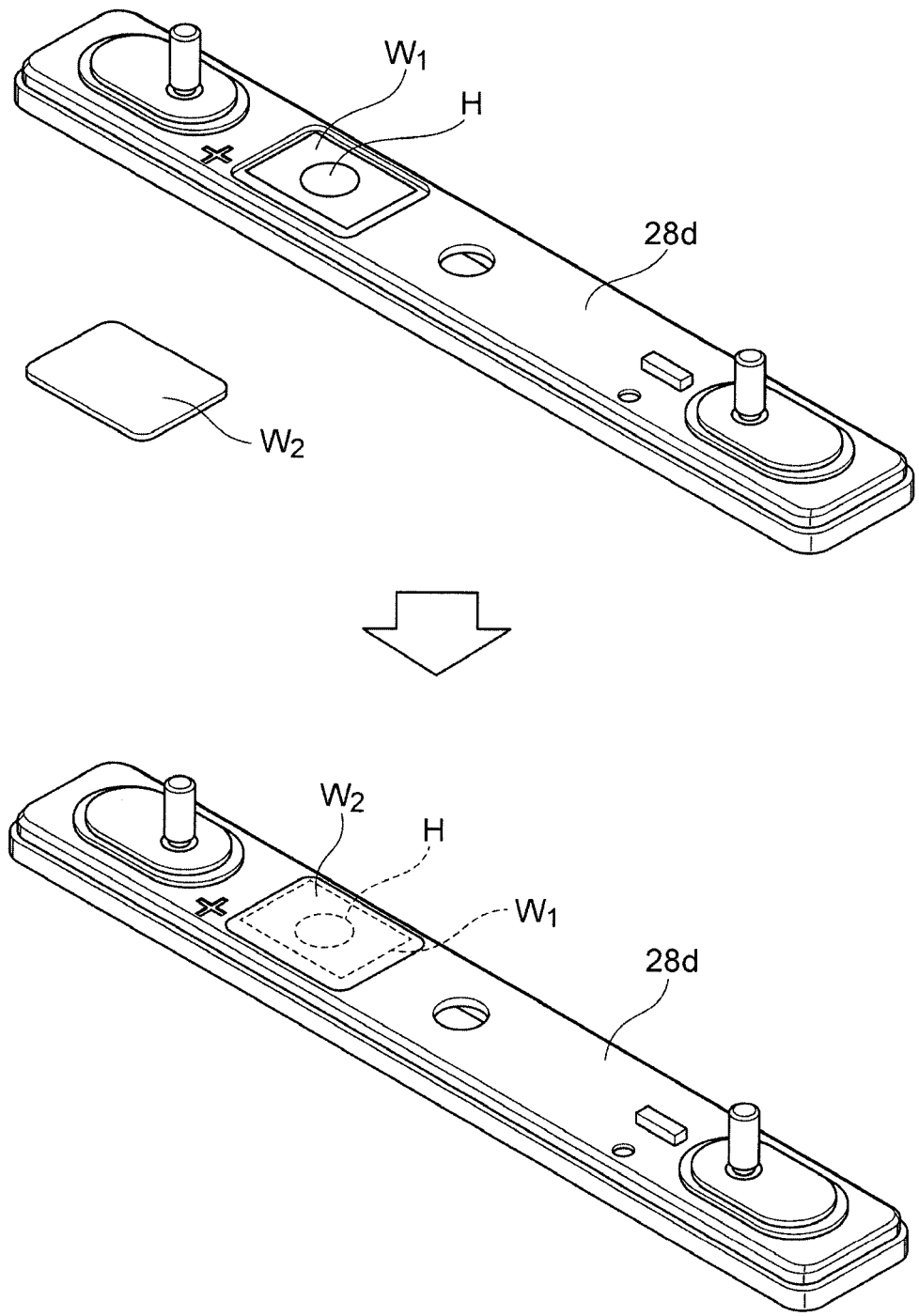
FIG. 13A is a perspective view of two resin members used to form a vulnerable portion before and after assembly.
Figure 13B:
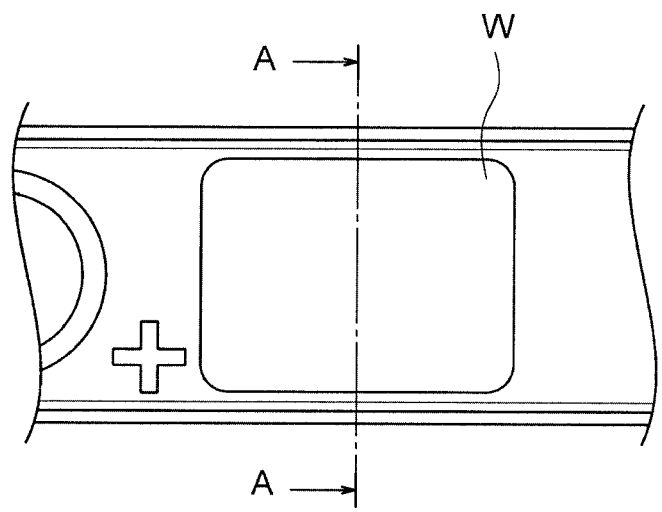
FIG. 13B is an enlarged view of a vulnerable portion W after the two resin members shown in FIG. 13A are welded together.
Figure 13C:
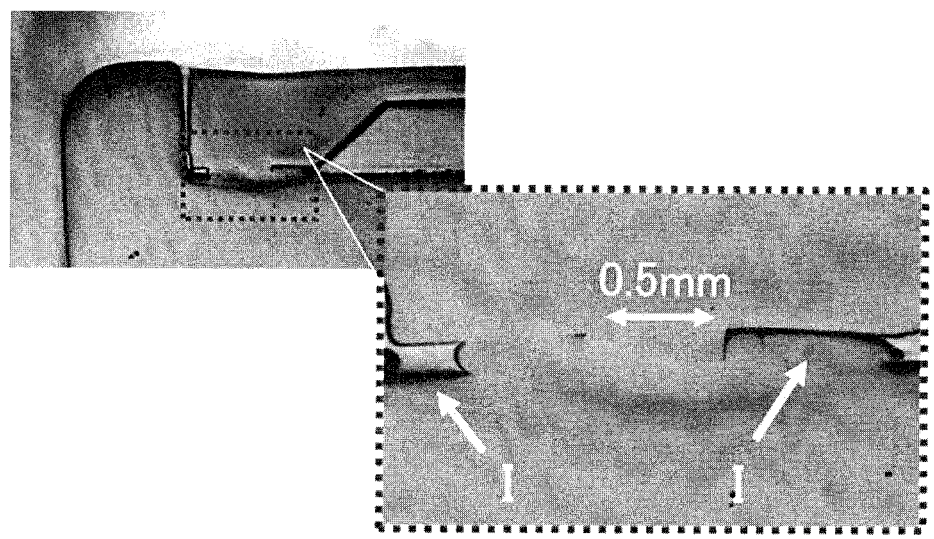
FIG. 13C is a photograph of the A-A cross-section of the vulnerable portion W shown in FIG. 13B.

FIG. 13A shows, as an example of two resin members for forming a vulnerable portion with a notch-shaped incompletely welded portion, a body of the lid part 28d having a recess that constitutes a first vulnerable element $W_1$ and a rupture plate that constitutes a second vulnerable element $W_2$. The first vulnerable element $W_1$ of the lid part 28d and the second vulnerable element $W_2$, which is a rupture plate, are shaped to fit each other. The first vulnerable element $W_1$ preferably has a through hole H. When the first vulnerable element $W_1$ and the second vulnerable element $W_2$ are mated, the vulnerable portion W can be made thinnest in the area of the through hole H (i.e., the thickness of the vulnerable portion W is equal to the thickness of the second vulnerable element $W_2$). Therefore, the through hole H and its surrounding area can be the most vulnerable portion in the vulnerable portion W. The size of the through hole H is preferably smaller than that of the rupture plate (second vulnerable element $W_2$). The shape of the through hole H can be any shape, preferably a round or square through hole. The overlapping portion between the first vulnerable element $W_1$ and the second vulnerable element $W_2$ in the area other than the through hole H has a total thickness of typically 0.1 to 5.0 mm, which means that the overlapping portion can also constitute the vulnerable portion W together with the area of the through hole H. In any case, by mating and welding these two resin members together, a vulnerable portion W (i.e., a combination of the first vulnerable element $W_1$ and the second vulnerable element $W_2$) can be formed as shown in FIG. 13. At that time, a notched-shaped incompletely welded portion can be formed around the welded portion. FIG. 13C shows an A-A cross section of the vulnerable portion W shown in FIG. 13B. As shown in FIG. 13C, a welded portion exists between the first vulnerable element $W_1$ (the body of the lid part 28d) and the second vulnerable element $W_2$ (the rupture plate), and a notch-shaped incompletely welded portion I exists around this welded portion. This notch-shaped incompletely welded portion I contributes to a significant improvement in the performance of triggering the breakdown of the vulnerable portion W.

A pressure release valve 30 capable of releasing gas from the box-shaped case 28 at a predetermined working pressure or higher is preferably provided in the portion of the lid part 28d other than the vulnerable portions W. In this case, it is preferable that the burst pressure (or working pressure) of the vulnerable portions W be higher than the working pressure of the pressure release valve 30. In this way, the vulnerable portions W can be destroyed only in an abnormal situation where the internal pressure rises to the extent that the pressure release valve 30 can no longer cope with it, without impairing the function of the pressure release valve 30. For example, it is preferable that the burst pressure (or working pressure) of the vulnerable portions W is 0.30 to 0.55 MPa and the working pressure of the pressure release valve 30 is 0.10 to 0.20 MPa. In other words, the pressure release valve 30 is designed to deal with gradual pressure changes, such as gradually discharging accumulated gas during normal battery operation, while the vulnerable portions W are designed to release abnormal pressure during a sudden pressure increase in abnormal situations.

In a preferred mode of the present invention, the outer surface of the pair of long-side walls 28b has a flat surface F and multiple ribs R which protrude from the flat surface F in a ridged manner. The multiple ribs R are preferably separated and provided parallel in the longitudinal direction. Providing the multiple ribs R on the flat outer surface of the long-side walls 28b of the box-shaped case 28 in this way makes it possible to ensure, for the battery module 100 made as shown in FIG. 4, excellent heat dissipation while maintaining a shape suitable for pressure application. In other words, a battery unit including a stacked-cell battery such as a nickel-zinc battery inside a case is desirably pressurized from the outside of the case in order to maximize the battery performance. This is because it is expected to minimize the gap that is located between the negative electrode and the LDH separator and allows the growth of zinc dendrites, thereby preventing zinc dendrite extension more effectively. For this purpose, the side shape of the case should be as flat as possible so that pressure can be applied to individual battery units when multiple battery units are arranged into a module. However, if the side portions of the case are flat, the battery units adhere to each other, or if inclusions such as a fire-retardant member 106 or other partition plates are inserted between the battery units, the battery units adhere to those inclusions, and the heat generated by the battery units cannot escape properly. In this regard, each alkaline secondary battery 10 in this embodiment has multiple ribs R on the flat outer surface of the long-side walls 28b, so that when the battery module 100 is made as shown in FIG. 4, the ribs R can function as spacers to form longitudinal ventilation holes, thereby ensuring excellent heat dissipation. In particular, this excellent heat dissipation can be more desirably achieved by, as shown in FIG. 4, allowing airflow to pass through the gaps defined by the ribs R in the direction of the arrow from the bottom of the battery module 100. Pressurizing the long-side walls 28b in the thickness direction toward the outside of the battery module 100 while ensuring such excellent heat dissipation allows the box-shaped case 28 to be flexed to apply pressure to the single cell elements 11.

The ribs R preferably have a height of 1.0 to 10 mm, more preferably 1.0 to 4.0 mm, even more preferably 1.2 to 3.5 mm, particularly preferably 1.4 to 3.0 mm, most preferably 1.5 to 2.5 mm with respect to the flat surface F. Within these ranges, it is possible to achieve excellent heat dissipation when the battery module 100 is completed, and also to improve the battery energy density by minimizing wasted space. The width of the ribs R is preferably 2.5 to 8.0 mm, more preferably 3.0 to 7.5 mm, even more preferably 3.5 to 7.0 mm, particularly preferably from 4.0 to 6.5 mm, most preferably 4.5 to 6.0 mm, from the viewpoint of both securing heat dissipation and applying pressure.

It is preferable that the ribs R be provided in such a way that the width of the ribs R gradually or stepwise becomes thicker in the direction from the bottom 28a to the lid part 28d, in order to facilitate release from a mold when the box-shaped case 28 is manufactured. The cross-sectional shape of the ribs R may be any shape such as rectangular, curved, or trapezoidal shape, but a trapezoidal shape is preferred from the viewpoint of release from the mold.

The number of ribs R for each long-side wall 28b is not limited, but preferably 5 to 11, more preferably 7 to 10, even more preferably 8 to 9. When the number of ribs R for each long-side wall 28b is five or more, the distance $D_L$ between the rib R closest to the left end of the long-side wall 28b (the connection portion with the short-side wall 28c) and the rib R second closest to this left end, and the distance $D_R$ between the rib R closest to the right end of the long-side wall 28b (the connection portion with the short-side wall 28c) and the rib R second closest to this right end are preferably shorter than the distance $D_M$ between the other ribs R away from both ends (i.e., left end and right ends) of the long-side wall 28b. Hence, the portions near both ends of the long-side walls 28b of the box-shaped case 28 (i.e., the portions near the short-side walls 28c) can be locally reinforced, suppressing the expansion of the box-shaped case 28 (especially the expansion in the thickness direction of the case 28) caused by the gas generated in the battery during abnormal operations such as overcharging, over-discharge, and short circuits. In particular, an excess space where electrodes do not reach is likely to be formed in the vicinity of both ends of the long-side walls 28b, and the gas generated in the event of an abnormal operation may accumulate there and intensively apply excessive internal pressure to the box-shaped case 28, but the box-shaped case 28 can be given strength to withstand such internal pressure.

Each alkaline secondary battery 10 may be any secondary battery using an alkaline electrolyte (typically an alkali metal hydroxide solution), but is preferably a zinc secondary battery using zinc for the negative electrode. Thus, it can be a nickel-zinc secondary battery, a silver-zinc oxide secondary battery, a manganese-zinc oxide secondary battery, or various other alkaline zinc secondary batteries. For example, the positive electrode preferably contains nickel hydroxide and/or nickel oxyhydroxide, whereby the zinc secondary battery is a nickel-zinc secondary battery.

Figure 7:
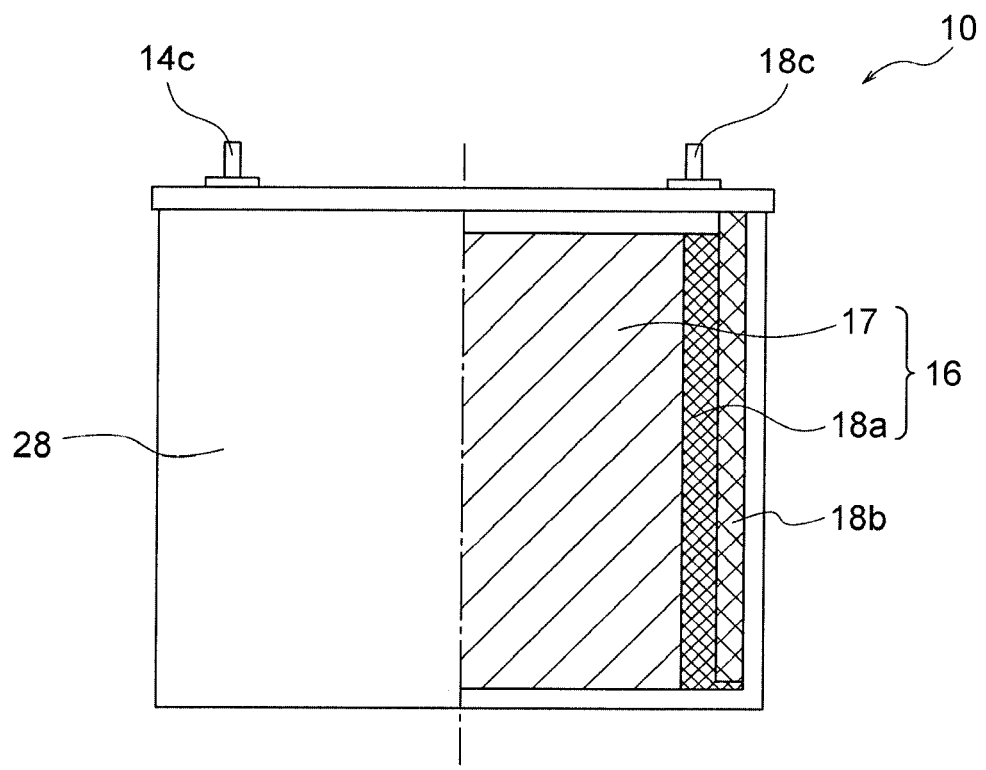
FIG. 7 shows the external and internal structure of the alkaline secondary battery shown in FIG. 5.

The case where the alkaline secondary battery 10 is a zinc secondary battery will be described below with reference to FIGS. 5 to 7. The alkaline secondary battery 10 (i.e., zinc secondary battery) shown in FIGS. 5 to 7 includes single cell elements 11. Each single cell element 11 includes a positive electrode plate 12, a negative electrode plate 16, a layered double hydroxide (LDH) separator 22, and an electrolyte (not shown in the drawing). The positive electrode plate 12 includes a positive electrode active material layer 13 and, if required, a positive electrode current collector. The negative electrode plate 16 includes a negative electrode active material layer 17 and, if required, a negative electrode current collector 18. The negative electrode active material layer 17 contains at least one material selected from the group consisting of zinc, zinc oxide, zinc alloys, and zinc compounds. The positive electrode active material layer 13 and the negative electrode active material layer 17 are separated from each other by the LDH separator 22. For example, it is preferable that the LDH separator 22 cover or wrap the entire negative electrode active material layer 17. An "LDH separator" herein is defined as a separator containing LDH and/or LDH-like compound that selectively passes hydroxide ions by exclusively utilizing the hydroxide ion conductivity of the LDH and/or LDH-like compound. An "LDH-like compound" herein refers to a hydroxide and/or oxide with a layered crystalline structure that may not be called LDH but is similar to LDH, and can be considered as an LDH equivalent. However, in a broader definition, "LDHs" can be interpreted to include not only LDHs but also LDH-like compounds. Typically, the positive electrode active material layer 13, the negative electrode active material layer 17, and the LDH separator 22 are quadrilateral (typically rectangular) in shape. Preferably, the positive electrode current collector has a positive electrode current collector tab 14a extending from one side of the positive electrode active material layer 13, and the negative electrode current collector 18 has a negative electrode current collector tab 18a extending, beyond the edge of the LDH separator 22, from one side of the negative electrode active material layer 17 opposite to the positive electrode current collector tab 14a. Consequently, it is preferable that the single cell elements 11 be capable of collecting current from opposite sides through the positive electrode current collector tab 14a and negative electrode current collector tab 18a. In addition, the outer edges of at least two adjacent sides C of the LDH separator 22 (except for one side overlapping with the negative electrode current collector tab) are preferably closed. This configuration makes it possible to provide a zinc secondary battery (especially a stacked-cell battery) that can prevent zinc dendrite extension without the need for complicated sealing and bonding between the LDH separator 22 and the battery container, in a simple configuration that is easy to assemble and collect current.

The positive electrode plate 12 includes a positive electrode active material layer 13. The positive electrode active material layer 13 is made of any material selected as appropriate from known positive electrode materials according to the type of zinc secondary battery. For example, in the case of a nickel-zinc secondary battery, a positive electrode containing nickel hydroxide and/or nickel oxyhydroxide is used. The positive electrode plate 12 further includes a positive electrode current collector (not shown in the drawing), and the positive electrode current collector has a positive electrode current collector tab 14a extending from one side of the positive electrode active material layer 13. A preferred example of the positive electrode current collector is a nickel porous substrate such as a foamed nickel plate. In this case, for example, a positive electrode plate composed of a positive electrode and a positive electrode current collector can be preferably fabricated by uniformly applying a paste containing an electrode active material such as nickel hydroxide to a porous nickel substrate and drying it. At that time, it is also preferable to stamp the dried positive electrode plate (i.e., positive electrode/positive electrode current collector) to prevent the electrode active material from falling off and to improve the electrode density. The positive electrode plate 12 shown in FIG. 6 includes a positive electrode current collector (e.g., foamed nickel), which is not shown in the drawing though. This is because the positive electrode current collector is fully integrated with the positive electrode active material layer 13, and the positive electrode current collector cannot be depicted separately. It is preferable that the alkaline secondary battery 10 further include a positive electrode current collector plate 14b connected to an end of a positive electrode current collector tab 14a, and, it is more preferable that multiple positive electrode current collector tabs 14a be connected to one positive electrode current collector plate 14b. In this way, current can be collected with a simple and space-efficient configuration, and connection to the positive electrode terminal 14c is made easier. In addition, the positive electrode current collector plate 14b itself may be used as a positive electrode terminal.

The negative electrode plate 16 includes a negative electrode active material layer 17. The negative electrode active material layer 17 contains at least one material selected from the group consisting of zinc, zinc oxide, zinc alloys, and zinc compounds. In other words, zinc may be contained in the form of zinc metal, zinc compound, or zinc alloy, as long as it has electrochemical activity suitable for the negative electrode. Preferred examples of negative electrode materials include zinc oxide, zinc metal, and calcium zinc oxide, but mixtures of zinc metal and zinc oxide are more preferred. The negative electrode active material layer 17 may be in the form of a gel or mixed with an electrolyte to form a negative electrode composite material. For example, a gelled negative electrode can be easily obtained by adding electrolyte and a thickener to the negative electrode active material. Examples of the thickener include polyvinyl alcohol, polyacrylates, CMC, and alginic acid. Polyacrylates are preferred because of its excellent chemical resistance to strong alkalis.

The zinc alloy should be a zinc alloy that does not contain mercury or lead and is known as a mercury-free zinc alloy. For example, a zinc alloy containing 0.01 to 0.1 mass % of indium, 0.005 to 0.02 mass % of bismuth, and 0.0035 to 0.015 mass % of aluminum is preferred because it is effective in inhibiting hydrogen gas generation. In particular, indium and bismuth are advantageous in improving the discharge performance. The use of a zinc alloy for a negative electrode can improve safety by slowing down the rate of self-dissolution in alkaline electrolyte, thereby suppressing hydrogen gas generation.

The negative electrode material may be formed in any shape but preferably in the form of powder so that the surface area can be increased and high current discharge can be dealt with. In the case of a zinc alloy, the average particle diameter of a preferred negative electrode material is in the range of 3 to 100 μm in short diameter. Within this range, the material has a large surface area and is therefore suitable for high current discharge, and also easy to mix uniformly with electrolyte and gelling agent, making it easy to handle during battery assembly.

Figure 9:
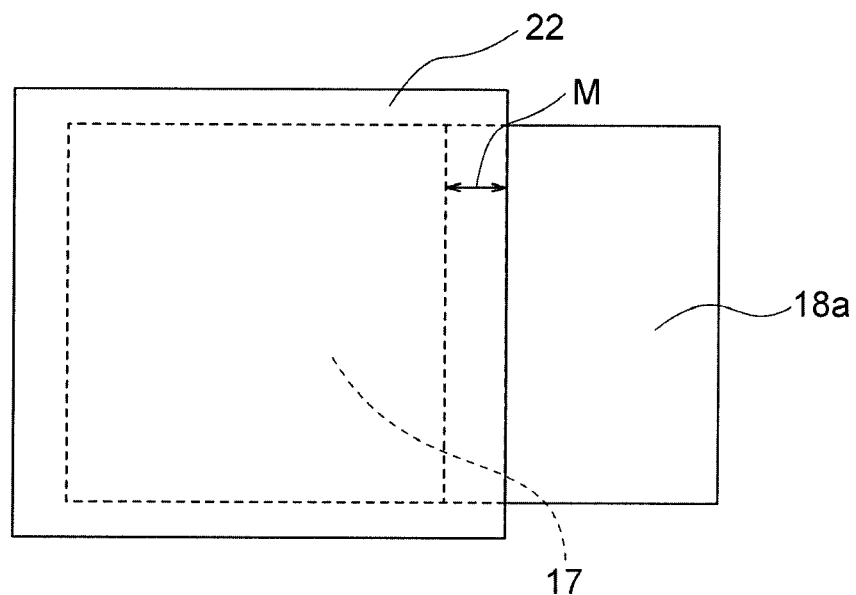
FIG. 9 is a schematic view of the area covered with the LDH separator in the negative electrode plate shown in FIG. 8A.

The negative electrode plate 16 can further include a negative electrode current collector 18. Preferably, the negative electrode current collector 18 includes a negative electrode current collector tab 18a extending from one side of the negative electrode active material layer 17 opposite to the positive electrode current collector tab 14a, beyond the edge of the LDH separator 22. Hence, the single cell elements 11 can collect current from opposite sides through the positive electrode current collector tab 14a and negative electrode current collector tab 18a. The alkaline secondary battery 10 preferably further includes a negative electrode current collector plate 18b connected to an end of a negative electrode current collector tab 18a, and, it is more preferable that multiple negative electrode current collector tabs 18a be connected to one negative electrode current collector plate 18b. In this way, current can be collected with a simple and space-efficient configuration, and connection to the negative electrode terminal 18c is made easier. In addition, the negative electrode current collector plate 18b itself may be used as a negative electrode terminal. Typically, the edge of the negative electrode current collector tab 18a forms an exposed portion that is not covered by the LDH separator 22 and (if present) a liquid retention member 20. This allows for a desirable connection of the negative electrode current collector 18 (particularly the negative electrode current collector tab 18a) to the negative electrode current collector plate 18b and/or the negative electrode terminal 18c via the exposed portion. In this case, as shown in FIG. 9, the LDH separator 22 preferably covers or wraps the negative electrode active material layer 17 with a predetermined margin M (e.g., 1 to 5-mm spacing) so that the LDH separator 22 sufficiently hides the end on the negative electrode current collector tab 18a side of the negative electrode active material layer 17. This effectively prevents the extension of zinc dendrite from the end of the negative electrode active material layer 17 on the negative electrode current collector tab 18a side or its vicinity.

Preferred examples of the negative electrode current collector 18 include copper foil, copper expanded metal, and copper perforated metal, but a copper expanded metal is more preferable. In this case, for example, a negative electrode plate composed of a negative electrode and a negative electrode current collector can be preferably fabricated by applying a mixture containing zinc oxide powder and/or zinc powder and, if required, a binder (e.g., polytetrafluoroethylene particles) on a copper expanded metal. At that time, it is also preferable to stamp the dried negative electrode plate (i.e., the negative electrode and negative electrode current collector) to prevent the electrode active material from falling off and to improve the electrode density.

The alkaline secondary battery 10 as a zinc secondary battery preferably further includes a liquid retention member 20 that is located between the negative electrode active material layer 17 and the LDH separator 22 and covers or wraps the entire negative electrode active material layer 17. Hence, the electrolyte can exist evenly between the negative electrode active material layer 17 and the LDH separator 22, and hydroxide ions can be efficiently transferred between the negative electrode active material layer 17 and the LDH separator 22. The liquid retention member 20 may be any member that can hold electrolyte, but is preferably a sheet-like member. Preferred examples of the liquid retention member include non-woven fabrics, water-absorbent resin, liquid-retaining resin, porous sheets, and various spacers, but a non-woven fabric is particularly preferred in that it allows the negative electrode structure to be fabricated at low cost and to offer good performance. The liquid retention member 20 preferably has a thickness of 0.01 to 0.20 mm, more preferably 0.02 to 0.20 mm, even more preferably 0.02 to 0.15 mm, particularly preferably 0.02 to 0.10 mm, most preferably 0.02 to 0.06 mm. With a thickness within these ranges, a sufficient amount of electrolyte can be retained in the liquid retention member 20 while the overall size of the negative electrode structure is kept compact without waste.

Figure 8A:
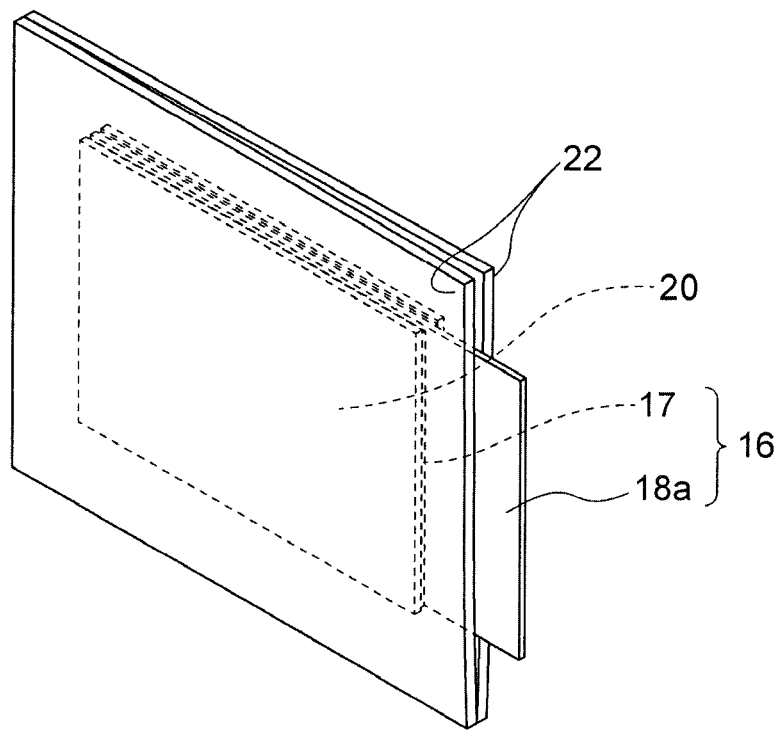
FIG. 8A is a perspective view of an example of a negative electrode plate supposed to be used in an alkaline secondary battery and having a negative electrode active material layer covered with an LDH separator.
Figure 8B:
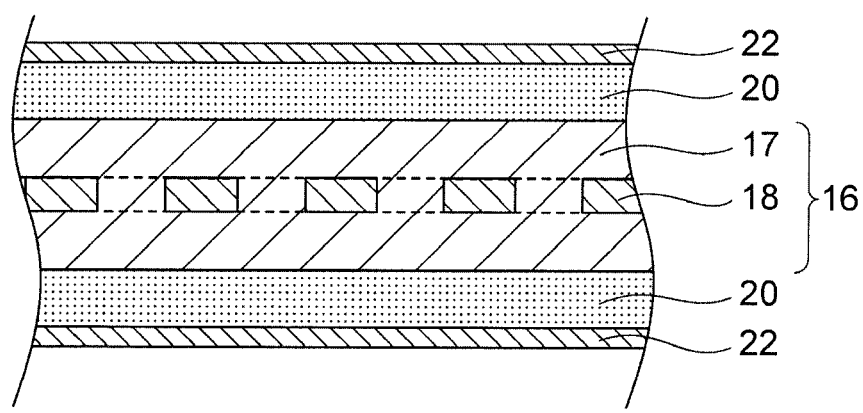
FIG. 8B is a schematic cross-sectional view of the layer structure of the negative electrode plate shown in FIG. 8A.

The entire negative electrode active material layer 17 is preferably covered or wrapped by the LDH separator 22. FIGS. 8A and 8B show a preferred mode of a negative electrode plate 16 in which the negative electrode active material layer 17 is covered or wrapped by the LDH separator 22. The negative electrode structure shown in FIGS. 8A and 8B includes a negative electrode active material layer 17, a negative electrode current collector 18, and, if required, a liquid retention member 20, and the entire negative electrode active material layer 17 is covered or wrapped with an LDH separator 22 (through the liquid retention member 20 as necessary). Wrapping or covering the entire negative electrode active material layer 17 with the LDH separator 22 (through the liquid retention member 20 as necessary) in this way eliminates the need for complicated sealing and bonding between the LDH separator 22 and the battery container as mentioned above, and enables fabrication of a zinc secondary battery (especially its stacked-cell battery) in which zinc dendrite extension can be prevented, in an extremely simple and highly productive manner.

In FIGS. 8A and 8B, the liquid retention member 20 is depicted as smaller than the LDH separators 22, but the liquid retention member 20 may be the same size as the LDH separators 22 (or folded LDH separator 22), and the outer edge of the liquid retention member 20 may reach the outer edges of the LDH separators 22. In other words, the outer periphery of the liquid retention member 20 may be sandwiched between the LDH separators 22 that constitute the outer periphery. In this case, the outer edges of the LDH separators 22 would be effectively sealed by thermal or ultrasonic welding as described below. In other words, rather than directly heat-welding or ultrasonically welding the LDH separators 22 to each other, indirectly heat-welding or ultrasonically welding the LDH separators 22 with a heat-weldable liquid retention member 20 between them is more effective in sealing, utilizing the heat-weldability of the liquid retention member 20 itself. For example, the end of the liquid retention member 20 to be sealed can be used as if it were a hot melt adhesive. A preferred example of a liquid retention member 20 in this case is a non-woven fabric, especially one made of thermoplastic resin (e.g., polyethylene or polypropylene).

The LDH separator 22 includes LDH and/or an LDH-like compound and a porous substrate. As mentioned above, the LDH plugs the pores of the porous substrate so that the LDH separator 22 exhibits hydroxide ion conductivity and gas impermeability (and hence functions as an LDH separator that exhibits hydroxide ion conductivity). It is preferable that the porous substrate be made of a polymeric material, and it is particularly preferable that the LDH be incorporated throughout the polymeric porous substrate in the thickness direction. For example, known LDH separators, such as those disclosed in Patent Literatures 3 to 5, can be used.

The number of LDH separators 22 for one negative electrode active material layer 17 is typically one per side (on both sides, two facing each other or one folded), but may be two or more. For example, several layers of LDH separators 22 may be used to cover or wrap the entire negative electrode active material layer 17 (which may be covered or wrapped by the liquid retention member 20).

As mentioned above, the LDH separator 22 has a quadrilateral shape (typically a square shape). The outer edges of at least two adjacent sides C of the LDH separator 22 (except for one side overlapping with the negative electrode current collector tab 18a) are closed. This allows the negative electrode active material layer 17 to be securely separated from the positive electrode plate 12, and prevents the extension of zinc dendrite more effectively. The reason why one side overlapping with the negative electrode current collector tab 18a is excluded from the side C to be closed is to make the negative electrode current collector tab 18a extendable.

According to a preferred mode of the present invention, each single cell element 11 is positioned so that the positive electrode plate 12, the negative electrode plate 16, and the LDH separator 22 are oriented vertically and one side C of the closed outer edge of the LDH separator 22 is located at the lower end, resulting in the positive electrode current collector tab 14a and the negative electrode current collector tab 18a extending horizontally from the opposite side ends of the single cell element 11. This makes it easier to collect current and removes obstacles from the upper open area when the upper one side of the outer edge of the LDH separator 22 is opened (which will be explained later), making it easier for gas to flow in and out between the positive electrode plate 12 and the negative electrode plate 16.

Incidentally, one or two sides of the outer edge of the LDH separator 22 may be open. For example, even if one side, the upper edge, of the LDH separator 22 is open, if electrolyte is injected so that it does not reach one side, the upper edge, during the fabrication of a zinc secondary battery, one side, the upper edge, will be free of electrolyte, thus avoiding the problems of leakage and zinc dendrite extension. In connection with this, each single cell element 11 is housed together with the positive electrode plate 12 in the case 28, which can be a sealed container, and is sealed with the lid part 28d, so that it can function as a major component of a sealed zinc secondary battery. Therefore, sufficient hermeticity can be ensured in the case 28, in which the single cell element 11 is to be ultimately housed, allowing the single cell element 11 itself to have a simple structure with an open top. Also, leaving one side of the outer edges of the LDH separator 22 open allows the negative electrode current collector tab 18a to be extended from there.

The outer edge of one side, which is the upper end of the LDH separator 22, is preferably open. This top-open structure can address the problem of overcharging in nickel-zinc batteries or other batteries. In other words, when a nickel-zinc battery is overcharged, oxygen ($O_2$) can be generated in the positive electrode plate 12, but the LDH separator 22 being so dense that it allows only hydroxide ions to pass through does not allow $O_2$ to pass through it. In this respect, the top-open structure allows $O_2$ to escape above the positive electrode plate 12 within the case 28 and be fed to the negative electrode plate 16 side through the top-opening, thereby oxidizing Zn in the negative electrode active material layer 17 with $O_2$ and returning it to ZnO. Through such an oxygen reaction cycle, use of a top-open type single cell element 11 in a sealed zinc secondary battery improves the overcharge resistance. Even if the outer edge of one side, which is the upper end of the LDH separator 22, is closed, providing ventilation holes in part of the closed outer edge is expected to provide the same effect as the aforementioned open-type structure. For example, ventilation holes may be opened after the outer edge of one side, which is the upper end of the LDH separator 22, is sealed, or a part of the aforementioned outer edge may be left unsealed during sealing so that the ventilation holes can be formed.

In any case, it is preferable that the closed side C of the outer edge of each LDH separator 22 be made by bending the LDH separator 22 and/or sealing the LDH separators 22 together. Preferred examples of sealing methods include adhesives, heat welding, ultrasonic welding, adhesive tapes, sealing tapes, and combinations thereof. In particular, since each LDH separator 22 containing a porous substrate of a polymeric material has the advantage of being flexible and therefore easy to bend, it is preferable that the LDH separator 22 be formed in a long shape and bent to close one side C of the outer edge. Heat welding and ultrasonic welding may be performed using commercially available heat sealers, for example; however, in the case of sealing LDH separators 22 together, it is preferable to perform heat welding and ultrasonic welding in such a way that the outer periphery of the liquid retention member 20 is sandwiched between the LDH separators 22 constituting the outer periphery, in order to accomplish more effective sealing. Although commercially available adhesives, adhesive tapes, and sealing tapes may be used, those containing resins with alkali resistance are preferred to prevent deterioration in alkaline electrolyte. From this perspective, examples of preferred adhesives include epoxy resin-based adhesives, natural resin-based adhesives, modified olefin resin-based adhesives, and modified silicone resin-based adhesives, but epoxy resin-based adhesives are more preferred for their particularly excellent alkali resistance. An example of an epoxy resin-based adhesive product is the epoxy adhesive Hysol (registered trademark) (manufactured by Henkel).

The electrolyte preferably contains an alkali metal hydroxide solution. The electrolyte is not shown in the drawing because it is spread over the entire positive electrode plate 12 (especially the positive electrode active material layer 13) and the negative electrode plate 16 (especially the negative electrode active material layer 17). Examples of alkali metal hydroxides include potassium hydroxide, sodium hydroxide, lithium hydroxide, and ammonium hydroxide, and potassium hydroxide is more preferred. A zinc compound such as zinc oxide or zinc hydroxide may be added to the electrolyte to suppress the self-dissolution of zinc and/or zinc oxide. As mentioned above, the electrolyte may be mixed with the positive electrode active material and/or the negative electrode active material to exist in the form of a positive electrode composite material and/or a negative electrode composite material. The electrolyte may also be gelled to prevent leakage of the electrolyte. A polymer that absorbs the solvent of the electrolyte and swells is preferably used as a gelling agent, and is a polymer such as polyethylene oxide, polyvinyl alcohol, or polyacrylamide, or starch.

Alkaline Secondary Battery Module

It is preferable to make an alkaline secondary battery module using multiple alkaline secondary batteries 10. FIG. 4 shows a preferred mode of an alkaline secondary battery module. The alkaline secondary battery module 100 shown in FIG. 4 includes a module case 102 and multiple alkaline secondary batteries 10. The module case 102 is a metal lidded container. The multiple alkaline secondary batteries 10 are housed in the module case 102 and are arranged so that the long-side walls 28b face each other. Since the alkaline secondary batteries 10 are housed in the module case 102, which is a metal lidded container, even if the vulnerable portion W ruptures due to hydrogen combustion in the nickel-zinc secondary battery 10, various troubles associated with the rupture (e.g., sudden increase in internal pressure, scattering of fragments, leakage of electrolyte, fire, and abnormal heat generation) can all be stopped inside the module case 102, thus ensuring safety sufficiently outside the module case 102.

In order to effectively stop an increase in the internal pressure caused by the rupture of the vulnerable portion W inside the module case 102, the burst pressure of the module case 102 (especially the top lid 102b) is preferably higher than the burst pressure of the vulnerable portion W. For example, it is preferable that the burst pressure of the module case 102 (especially the top lid 102b) be higher than 1.20 MPa. According to the inventor's calculations, the maximum gas release pressure that can be reached when hydrogen combustion occurs in one nickel-zinc secondary battery 10 in the module case 102 and ruptures the vulnerable portion W is estimated to be 1.2 MPa. Therefore, since the maximum pressure resistance of the top lid of the module case 102 is made higher than 1.2 MPa, even if hydrogen combustion occurs inside the module case 102 to cause the rupture of the vulnerable portion W of one nickel-zinc secondary battery 10, various troubles associated with the rupture (e.g., sudden increase in internal pressure, scattering of fragments, leakage of electrolyte, fire, and abnormal heat generation) can all be accurately stopped inside the module case 102 (especially the top lid 102b), thus ensuring safety sufficiently outside the module case 102.

The module case 102 is a metal lidded container including a container body 102a and a top lid 102b. In other words, both the container body 102a and the top lid 102b are composed of metal plates to ensure that the module case 102 has sufficient pressure resistance, heat resistance, and strength. In particular, since the top lid 102b is placed near the vulnerable portions W, pressure resistance, heat resistance, and strength sufficient to withstand the pressure and temperature at the time of rupture of the vulnerable portion W are desired. From this perspective, a steel plate or stainless steel plate is a preferred example of the metal plate for the top lid 102b. The thickness of the metal plate for the top lid 102b is preferably 1.0 to 3.0 mm, more preferably 1.5 to 2.5 mm. On the other hand, a steel plate or stainless steel plate is a preferred example of the metal plate for the container body 102a. The thickness of the metal plate for the container body 102a may be determined as appropriate taking into account the allowable weight as long as the desired pressure resistance or strength can be secured, but is preferably 0.8 to 2.5 mm, more preferably 1.0 to 2.0 mm. It is desirable that, in order to stop the increase in internal pressure caused by the rupture of the vulnerable portion W within the module case 102, the top lid 102b be firmly fixed to the container body 102a. It is preferable that the top lid 102b be fixed to the container body through a bolt and nut connection so that the top lid 102b can be removed when necessary (for example, at the time of replacement or maintenance of the alkaline secondary batteries 10) while ensuring sufficient pressure resistance. Even though the module case 102 is a lidded container, it is desirable not to make it a completely sealed container in order to allow the internal pressure to escape outside. For example, it is preferable that the module case 102 has a structure that allows the internal pressure to be released to the outside at a point facing or connected to the interior space above the alkaline secondary battery 10.

It is desirable that an air flow path be formed in the module case 102 to cool the alkaline secondary batteries 10. It is preferred that an air inlet 102c be disposed on one side of the module case 102 while an air outlet 102d is disposed on the opposite side of the module case 102, and the air outlet 102d is provided with a fan 108. The fan 108 can be a small ventilation fan. With this configuration, air flows through the module case 102 by activating the fan 108, so that the alkaline secondary batteries 10 can be cooled. In order to efficiently cool the alkaline secondary batteries 10, it is preferable to provide a shield plate 104 within the module case 102 and partition an intake flow path 110, which supplies air from the air inlet 102c under the alkaline secondary batteries 10, and an exhaust flow path 112, which leads the air that escapes upward through the gap between the alkaline secondary batteries 10 to the air outlet 102d. In this case, the gaps between the alkaline secondary batteries 10 also constitute flow paths. However, if the box-shaped cases 28 have ribs R, the ribs R can act as spacers, thereby forming longitudinal ventilation holes and ensuring excellent heat dissipation. In order to secure and not to block the exhaust flow path 112, the lid part 28d of the box-shaped cases 28 is preferably separated from the top lid 102b by a predetermined distance which is preferably 10 to 50 mm, more preferably 20 to 30 mm. Similarly, in order to ensure and not to block the intake flow path 110, the bottom 28a of the box-shaped cases 28 is preferably separated from the bottom of the container body 102a by a predetermined distance which is preferably 3 to 20 mm, more preferably 5 to 15 mm. In order to hold the bottom 28a of the box-shaped cases 28 higher than the bottom of the module case 102, it is preferable to provide a ventilatable spacer such as a frame or rail at the bottom of the module case 102 and place the alkaline secondary batteries 10 (i.e., the box-shaped cases 28) thereon.

It is preferable to provide a fire-retardant member 106 between adjacent alkaline secondary batteries 10 (i.e., box-shaped cases 28). Since the box-shaped cases 28 are made of resin, if the box-shaped cases 28 adjoin each other, a fire in one box-shaped case 28 may spread to other box-shaped cases 28. However, such fire spread can be suppressed by providing a fire-retardant member 106 between adjacent box-shaped cases 28. In order to achieve these effects more effectively, it is particularly preferable to adopt a configuration shown in FIG. 10 in which the side ends of each fire-retardant member 106 reach the side walls of the module case 102, thereby separating adjacent box-shaped cases 28 from each other in such a way that they cannot spread fire. It is however preferable that the upper ends of the fire-retardant members 106 do not reach the top lid 102b of the module case 102, be located at approximately the same height as the alkaline secondary batteries 10, and be configured so as not to obstruct the exhaust flow path 112 in the module case 102.

Similarly, it is preferable that the lower ends of the fire-retardant members 106 do not reach the bottom of the container body 102a, be located at the same height as the bottom of the alkaline secondary batteries 10, and be configured so as not to obstruct the intake flow path 110 in the module case 102. Various known fire-retardant members, for example, embossed mica plates can be used as the fire-retardant members 106.

EXAMPLES

The present invention will be explained in more detail taking the following examples.

Examples 1 to 3

(1) Fabrication of Alkaline Secondary Battery

A box-shaped case 28 and multiple single cell elements with the following specifications were prepared, and the multiple single cell elements were housed vertically in the box-shaped case 28 in the form of a stacked-cell battery, thereby assembling the nickel-zinc secondary battery 10 shown in FIG. 1.

(Specifications of Box-Shaped Case)
Material: Modified polyphenylene ether resin (Zylon™TZ100, manufactured by Asahi Kasei Corporation)
External dimensions: width 20 cm, depth 3 cm, height 170 cm (not including the height of the positive electrode terminal 14c and negative electrode terminal 18c)
Thickness of the main part other than the vulnerable portion W and ribs R: 2 mm
Thickness of vulnerable portion W: 0.4±0.02 mm (Example 1), 0.5±0.02 mm (Example 2) or 0.6±0.02 mm (Example 3)
Location and number of vulnerable portions W: Two locations on the lid part 28d of the box-shaped case 28
Area of the vulnerable portions W: 12.6 cm$^2$ (=4.8 cm$^2$+ 7.8 cm$^2$)
Proportion of the area of the vulnerable portions W with respect to the total area of the lid part 28d in the plan view: 22%.
Working pressure of the pressure release valve 30: 0.15 MPa
Maximum pressure resistance of the box-shaped case 28 (other than the vulnerable portions W): 0.8 to 1.2 MPa
(Specifications of Single Cell Elements)
Positive electrode structure: Pores of foamed nickel are filled with a positive electrode paste containing nickel hydroxide and a binder, dried, and covered with a non-woven fabric.
Negative electrode structure: A copper expanded metal is crimped with a negative electrode active material layer containing metallic zinc and zinc oxide powder with a binder, and covered with a non-woven fabric.
LDH separator: Pressed separator made by plugging the pores of a porous substrate made of high polymer (polyethylene) with LDH so as to provide hydroxide ion conductivity and gas impermeability.

Electrolyte: 5.4 mol % potassium hydroxide aqueous solution (2) Test Method

Figure 11:
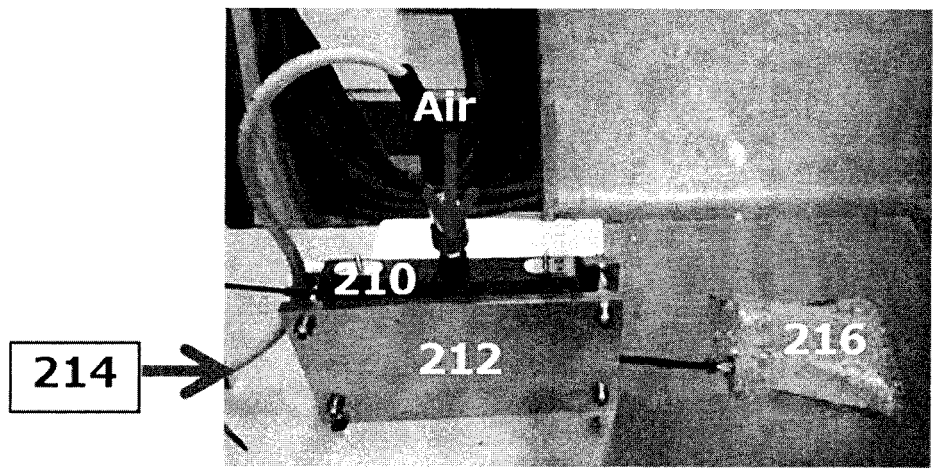
FIG. 11 is a photograph of the burst pressure measurement system fabricated in an example.

The measurement system shown in FIG. 11 was constructed. In this measurement system, a nickel-zinc secondary battery 210 is fixed by being sandwiched with a restraining jig 212 from both sides. A hose is connected to the hole corresponding to the pressure release valve of the nickel-zinc secondary battery 210, and the other end of this hose is connected to a compressor 214. This enables compressed air to be pumped from the compressor 214 into the nickel-zinc secondary battery 210. A pressure gauge 216 is connected to the nickel-zinc secondary battery 210 (specifically, a hole machined in the short-side wall 28c of the box-shaped case 28) to enable measurement of the pressure (internal pressure) inside the nickel-zinc secondary battery 210. In this measurement system, compressed air was fed into the nickel-zinc secondary battery 210 to increase the internal pressure, and the burst pressure (MPa) of the vulnerable portion W was measured. The internal pressure measured when the vulnerable portion W was destroyed was regarded as the burst pressure. The results were as shown in Table 1 below.

TABLE 1

|  |  | Ex. 1 | Ex. 2 | Ex. 3 |
|---|---|---|---|---|
| Level of vulnerable portion thickness (mm) | | 0.4 | 0.5 | 0.6 |
| Proportion of area of venerable portion to entire lid part (%) | | 22 | 22 | 22 |
| Number of measurement sample (N) | | 9 | 10 | 10 |
| Average of vulnerable portion thickness (actual measurement) (mm) | | 0.43 | 0.52 | 0.62 |
| Burst pressure of vulnerable portion | Average burst pressure $P_{ave}$ (MPa) | 0.41 | 0.46 | 0.62 |
| | Standard deviation of burst pressure $\sigma$ | 0.036 | 0.029 | 0.085 |
| | $P_{ave} - 3\sigma$ (MPa) | 0.30 | 0.37 | 0.36 |
| | $P_{ave} + 3\sigma$ (MPa) | 0.51 | 0.54 | 0.87 |
| Working pressure of vulnerable portion (=$P_{ave} \pm 3\sigma$) (MPa) | | 0.30–0.51 | 0.37–0.54 | 0.36–0.87 |
| Whether (release valve working pressure + 0.05 MPa) < (vulnerable portion working pressure) is satisfied | | Satisfied | Satisfied | Satisfied |
| Whether (vulnerable portion working pressure) < (maximum pressure resistance of box-shaped case) is satisfied | | Satisfied | Satisfied | Generally satisfied, but not always, satisfied |
| Evaluation | | Good | Good | Acceptable |

As is clear from Table 1, the relationship (pressure release valve working pressure+0.05 MPa)<(working pressure of the vulnerable portion) was satisfied in all the box-shaped cases 28 of Examples 1 to 3, indicating that the vulnerable portion W is destroyed only in an abnormal situation where the internal pressure rises so rapidly that the pressure release valve 30 can no longer cope with it without impairing the function of the pressure release valve. In Examples 1 and 2, the relationship (working pressure of the vulnerable portion) <(maximum pressure resistance of the box-shaped case) is also satisfied, which is advantageous in that the vulnerable portion W is preferentially and surely destroyed before the entire box-shaped case 28 is destroyed. In Example 3, the relationship (working pressure of the vulnerable portion)< (maximum pressure resistance of the box-shaped case) is generally satisfied, which can be said to be acceptable, but it is not always satisfied; therefore, it is desirable to take measures such as reinforcing the box-shaped case 28. In any case, it can be said that the box-shaped cases 28 of Examples 1 and 2 are superior to the box-shaped cases 28 of Example 3 in that they satisfy the relationship (pressure release valve working pressure+0.05 MPa)<(working pressure of the vulnerable portion)<(maximum pressure resistance of the box-shaped case).

(3) Fabrication of Alkaline Secondary Battery Module

Figure 10:
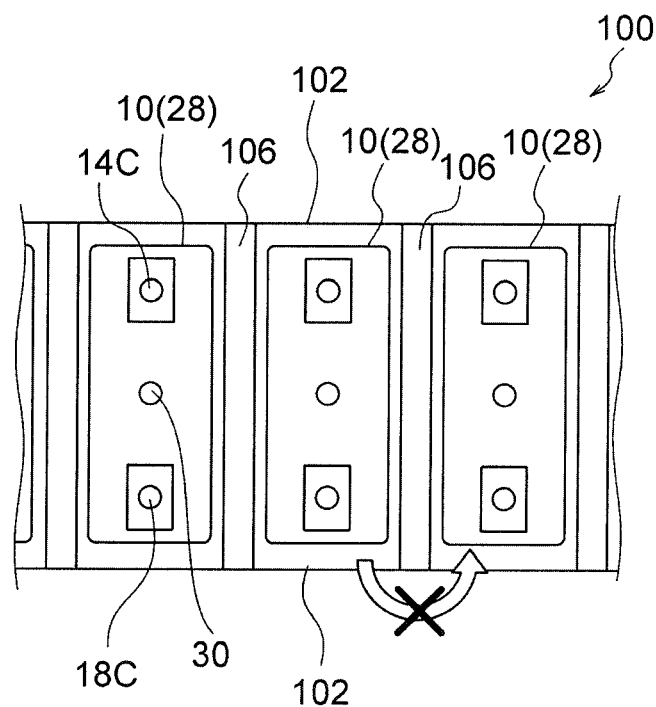
FIG. 10 is a schematic top view of an arrangement of a fire-retardant member in the alkaline secondary battery module.
Figure 12A:
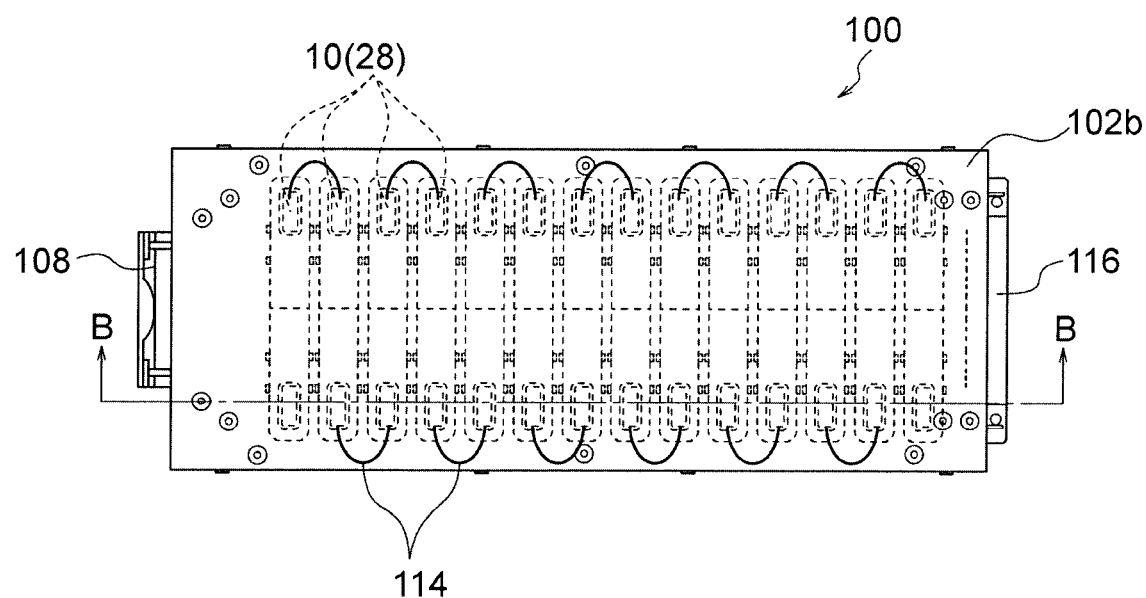
FIG. 12A is a top view of the alkaline secondary battery module fabricated in the example.
Figure 12B:
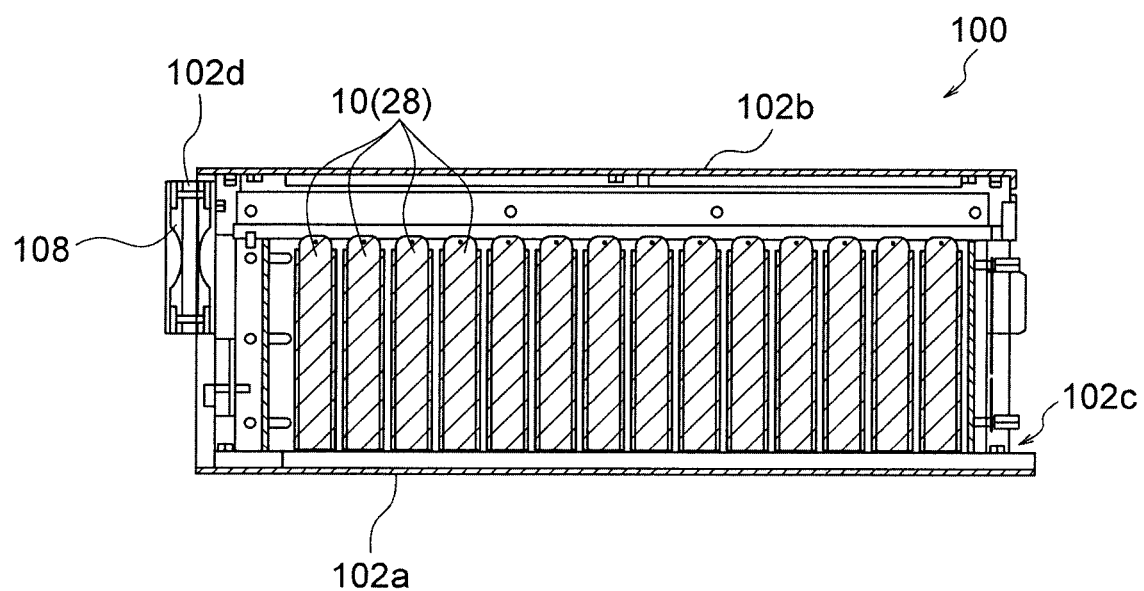
FIG. 12B is a cross-sectional view of the alkaline secondary battery module along line B-B shown in FIG. 12A.

As specifically shown in FIGS. 12A and 12B, in a module case 102 with the following specifications having the configuration schematically shown in FIG. 4, fourteen nickel-zinc secondary batteries 10 connected in series through wiring 114 were arranged so that the longitudinal side walls 28b of the box-shaped cases 28 face each other. At this time, as shown in FIGS. 4 and 10, embossed mica plates (manufactured by Okabe Mica Co., Ltd., 5-mm thick) were placed between adjacent box-shaped cases 28 as fire-retardant members 106 so that both ends of the embossed mica plates reached the side walls of the module case 102, thereby separating adjacent box-shaped cases 28 in such a way that they cannot spread fire. An air inlet 102c is provided at one end of the module case 102, while an air outlet 102d is provided at the other end of the module case 102. A fan 108 (ventilation fan) was attached to the air outlet 102d while a cell monitoring unit (CMU) 116 was attached near the air inlet 102c. This is how the alkaline secondary battery module 100 was fabricated.

(Specifications of Module Case 102)

External dimensions: 67 cm×25 cm, 23 cm high

Material of top lid 102b: SPCC (cold-rolled steel sheet)

Thickness of top lid 102b: 2.3 mm

Material of container body 102a: SPCC (cold-rolled steel sheet)

Thickness of metal plate constituting container body 102a: 1.2 mm

Method of fixing container body 102a and top lid 102b: Bolt-nut connection

Distance between lid part 28d of nickel-zinc secondary battery 10 and top lid 102b of module case 102: 35 mm or more Maximum pressure resistance (burst pressure) of top lid 102b of module case 102: more than 1.20 MPa (higher than the working pressure of the vulnerable portion W)

According to the inventor's calculations, the maximum gas release pressure reached when hydrogen combustion occurs in one nickel-zinc secondary battery 10 in the module case 102 and the vulnerable portion W ruptures is estimated to be 1.2 MPa. Therefore, since the top lid 102b of the module case 102 has a maximum pressure resistance of higher than 1.2 MPa, even in the event of hydrogen combustion causing rupture of the vulnerable portion W due to hydrogen combustion in one nickel-zinc secondary battery 10 in the module case 102, various troubles (such as a sudden increase in internal pressure, scattering of fragments, leakage of electrolyte, fire, and abnormal heat generation) associated with the rupture can all be accurately stopped within the module case 102, thereby sufficiently securing safety outside the module case 102. In particular, since adjacent box-shaped cases 28 are separated from each other by fire-retardant members 106 as shown in FIG. 10, a fire in one box-shaped case 28 is effectively prevented from spreading to the adjacent box-shaped cases 28 (see the arrows in the drawing). In other words, a fire in one box-shaped case 28 can be stopped only in that one box-shaped case 28, thereby minimizing the damage.

What is claimed is:

1. A zinc secondary battery comprising:
   a stacked-cell battery in which multiple single cell elements having a configuration of a zinc secondary battery are stacked; and
   a box-shaped case made of resin in which the stacked-cell battery is housed vertically, wherein
   the box-shaped case has a bottom, a pair of long-side walls parallel to the stacked-cell battery, a pair of short-side walls perpendicular to the stacked-cell battery, and a lid part,
   the lid part has a vulnerable portion having a smaller thickness than another portion of the lid part, the thickness of the vulnerable portion is 0.1 to 1.0 mm, and a proportion of an area of the vulnerable portion with respect to a total area of the lid part in a plan view is 10 to 40%,
   the vulnerable portion includes a notch-shaped incompletely welded portion, and
   the vulnerable portion has a welded portion where at least two resin members are welded together, and the notch-shaped incompletely welded portion exists around the welded portion.

2. The zinc secondary battery according to claim 1, wherein the portion of the lid part other than the vulnerable portion has a thickness of 1.0 to 3.0 mm.

3. The zinc secondary battery according to claim 1, wherein the resin is at least one selected from the group consisting of polyolefin resin, ABS resin, and modified polyphenylene ether resin.

4. The zinc secondary battery according to claim 1, wherein the number of vulnerable portions is two or more, and the two or more vulnerable portions are separated from each other.

5. The zinc secondary battery according to claim 1, wherein the zinc secondary battery further comprises a pressure release valve in the portion of the lid part other than the vulnerable portion, the pressure release valve being capable of releasing gas from the box-shaped case at or above a predetermined working pressure.

6. The zinc secondary battery according to claim 5, wherein a burst pressure of the vulnerable portion is higher than the working pressure of the pressure release valve.

7. The zinc secondary battery according to claim 6, wherein the burst pressure of the vulnerable portion is 0.30 to 0.55 MPa and the working pressure of the pressure release valve is 0.10 to 0.20 MPa.

8. The zinc secondary battery according to claim 1, wherein the zinc secondary battery is a nickel-zinc secondary battery.

9. The zinc secondary battery according to claim 1, wherein
   the single cell element includes:
   a positive electrode plate including a positive electrode active material layer;
   a negative electrode plate including a negative electrode active material layer including at least one selected from the group consisting of zinc, zinc oxide, a zinc alloy, and a zinc compound;
   an LDH separator including a layered double hydroxide (LDH) and/or an LDH-like compound; and
   an electrolyte, wherein
   the positive electrode active material layer and the negative electrode active material layer are separated from each other by the LDH separator.

10. The zinc secondary battery according to claim 9, wherein the LDH separator includes an LDH and/or an LDH-like compound and a porous substrate, and the LDH plugs pores of the porous substrate so that the LDH separator exhibits hydroxide ion conductivity and gas impermeability.

11. A zinc secondary battery module comprising:
    a module case that is a metal lidded container; and
    a plurality of the zinc secondary batteries according to claim 1, being housed in the module case, and being arranged so that the long-side walls face each other.

12. The zinc secondary battery module according to claim 11, wherein the burst pressure of the module case is higher than the burst pressure of the vulnerable portion.

13. The zinc secondary battery module according to claim 11, wherein the burst pressure of the module case is higher than 1.20 MPa.

14. The zinc secondary battery module according to claim 11, further comprising a fire-retardant member between the box-shaped cases that are adjacent.

15. The zinc secondary battery module according to claim 14, wherein side ends of the fire-retardant member reach the side walls of the module case, thereby separating the adjacent box-shaped cases from each other such that fire cannot spread between the adjacent box-shaped cases.

\* \* \* \* \*